Nov. 28, 1961    H. J. RUMRILL ET AL    3,010,329
VEHICLE POSITION INDICATOR
Filed June 18, 1958    2 Sheets-Sheet 1
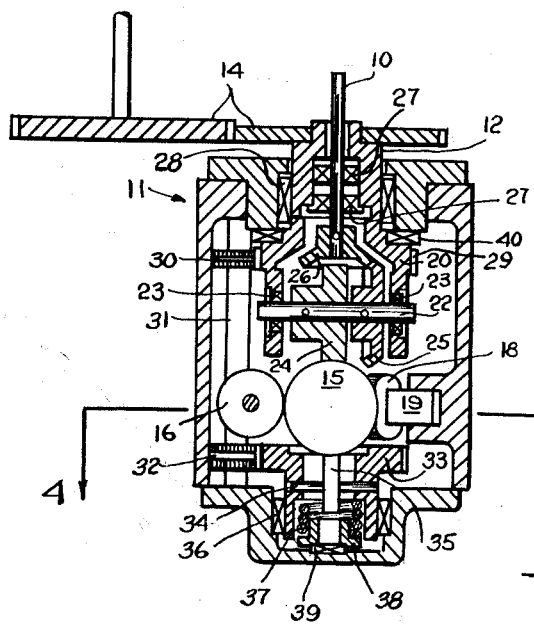
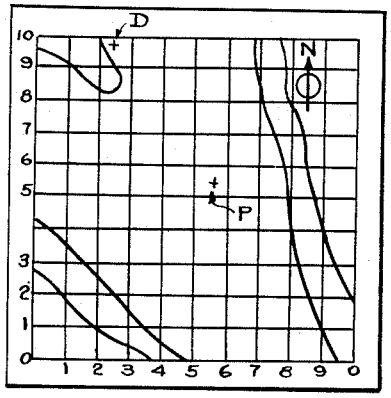
Fig.2.
Fig.3.
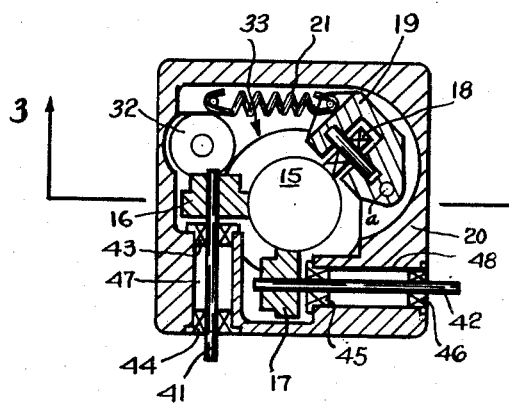
Fig.4.
INVENTORS
HOWARD J. RUMRILL
EDWIN W. HOWE
BY
Raymond A. Paquin
ATTORNEY.

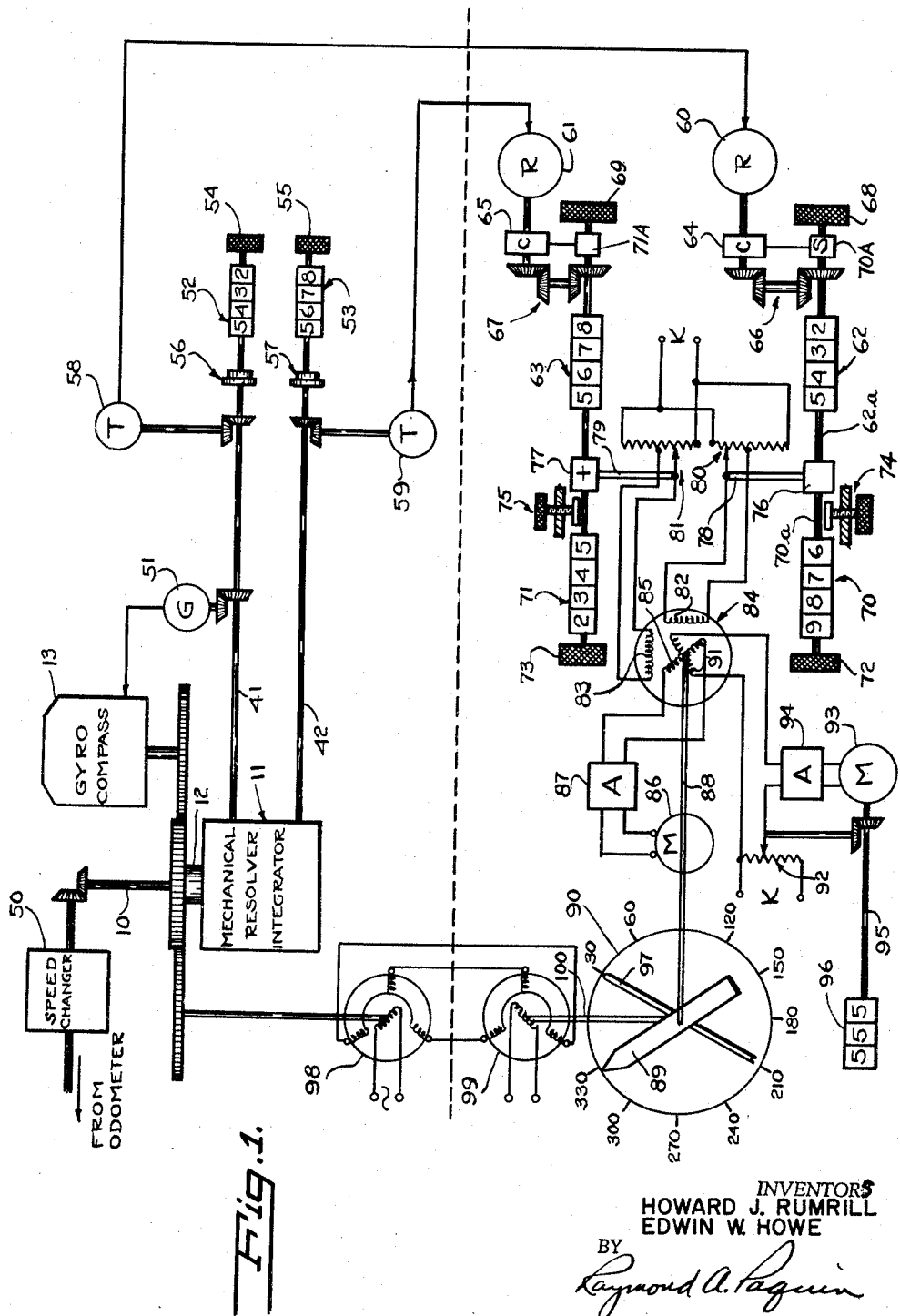

United States Patent Office 3,010,329
Patented Nov. 28, 1961

3,010,329
VEHICLE POSITION INDICATOR
Howard J. Rumrill, Mineola, and Edwin W. Howe, North Baldwin, N.Y.; said Rumrill assignor to American Bosch Arma Corporation, a corporation of New York
Filed June 18, 1958, Ser. No. 742,849
3 Claims. (Cl. 74—198)

The present invention relates to navigation apparatus, and has specific reference to position indicators for land vehicles.

The vehicle position indicator of this invention is a small, reliable, accurate device which indicates, in rectangular coordinates, the present position of the vehicle and, in polar coordinates, the distance and bearing to a predetermined destination from the present position.

The vehicle position indicator includes two major units, the vehicle position computer and the destination bearing and distance computer. The latter may be remotely positioned with respect to the position computer for convenience. In operation, the rectangular coordinates of the initial position are set into mechanical counters in each of the two major units. The vehicle position computer includes a mechanical resolver-integrator having inputs according to the heading from a gyro compass and speed from the vehicle odometer, which provides outputs proportional to the distances traveled by the vehicle in the north and east directions. The mechanical counters of the vehicle position computer are operatively connected to the resolver-integrator outputs so that the counters indicate the present position coordinates.

The mechanical counters of the distance and bearing computer are also driven according to the mechanical resolver-integrator outputs preferably through an electromechanical link, such as a step motor, for example. The distance and bearing computer contains another set of counters on which the coordinates of the destination are manually inserted. The rectangular coordinates of the distance between the present position and destination are obtained by mechanical differentials connected to the appropriate counters. Electrical signals proportional to these rectangular coordinates are obtained from potentiometers driven by the mechanical differentials and the signals are applied to an electromechanical resolver to obtain the vector values of distance to go and true bearing to destination in the well-known manner. For convenience, the heading of the vehicle and the bearing to the destination are displayed simultaneously on the same instrument.

The mechanical resolver-integrator used in the vehicle position computer is one of the ball-type resolvers whose theoretical aspects are well known in the art. However, the particular component to be described here has been specially designed as a miniature, dependable, accurate component and is preferable to others of the same class. The improvements in the ball resolver of preferred choice will be fully described in the following.

For a better understanding of the invention, reference may be had to the accompanying diagrams, in which:

FIG. 1 is a schematic diagram of the vehicle position indicator;

FIG. 2 is a representative coordinate map;

FIG. 3 is a section of the ball resolver-integrator; and

FIG. 4 is another section of the ball resolver-integrator.

The vehicle position indicator of FIG. 1 requires geographical information in the form of grid coordinates rather than latitude and longitude. FIG. 2 shows such a grid reference by which geographical locations are identified by rectangular coordinates. Thus, the position P is designated as 5432 north and 5678 east, while the position D is designated as 9876 north and 2345 east. The actual grid is much larger than FIG. 2 and the lines are closer spaced than shown in FIG. 2, so that the four place readings of position are easily determined.

The position indicator of FIG. 1 comprises two units; one, above the dotted line, is the vehicle position computer, and the other, below the line, is the remote destination bearing and distance computer.

The vehicle position computer includes a mechanical resolver-integrator 11 of advanced design having a pair of concentric inputs 10 and 12 which are respectively driven according to the speed of the vehicle and displaced according to the heading of the vehicle.

The mechanical resolver-integrator of preferred design is detailed in FIGS. 3 and 4. This preferred construction permits manufacture of a precision component in a minimum size. With reference now to these figures, the resolver-integrator 11 includes a ball 15 which is urged against a pair of perpendicularly disposed output rollers 16 and 17, by an idler roller 18. The roller 18 may be a ball bearing mounted on a short shaft in the member 19, which member is pivoted in frame 20 at $a$ and is urged toward the ball 15 by the tension spring 21 connected between pins on member 19 and frame 20. Rollers 16, 17 and 18 are positioned so that their points of contact are all in the same equatorial plane of ball 15, and their planes of rotation are perpendicular to that equatorial plane.

The outer coaxial input shaft or cage 12 is journalled in bearing 28 in the frame 20, and carries at its inner end a shaft 22 which is journalled in the bearing 23. The inner coaxial input shaft 10 is journalled in bearings 27 within the cage 12 and carries at its inner end a bevel gear 26. The bevel gear 26 meshes with a bevel gear 25 on shaft 22, on which a roller 24 is also mounted. Thus, the roller 24 is driven at a speed proportional to the speed of rotation of input shaft 10, and the axis of rotation of the roller 24 is controlled by the angular position of cage 12.

The rotation of roller 24 is transferred to the ball 15 by urging the ball 15 against roller 24 by means of the coil spring 37 and the roller 35, as will be described. In the interest of accuracy it is imperative that the idler roller 35 be forced to rotate in the same plane as the input roller 24 so that the ball 15 will rotate about an axis parallel to the rotational axis of the roller 24. To this end the cage 12 and the collar 33, in which roller 35 is mounted on shaft 34, are geared to rotate together. Thus, gear teeth 29 are formed on a projection on cage 12 and are adapted to mesh with the teeth of gear 30. Gear 30 is attached to a stud shaft 31 which is rotatable in bearings (not shown) in the frame 20. The lower end of shaft 31 carries a gear 32 which meshes with gear teeth formed on the flange of the collar 33. Gearing 30 and 32 are preferably split gears in order to minimize the backlash between the gears on cage 12 and collar 33.

Roller 35, which may be a ball bearing, for example, is mounted on a shaft 34 in the collar 33. The collar 33 is journalled in bearing 36 which provides longitudinal as well as rotational freedom in frame 20, and is urged toward ball 15 by the coil spring 37 located between the collar 33 and the hub 38.

Thrust bearings 39 and 40 between the frame 20 and, respectively, the hub 38 and cage 12 assure free rotation of these elements.

For precision, the rollers 16 and 17 must contact ball 15 at positions precisely 90° apart. To this end the shafts 41 and 42, to which rollers 16 and 17 are attached, are journalled in bearings 43, 44 and 45, 46 respectively at the extremities of the precisely bored holes 47 and 48 in the frame 20. The perpendicularity of the holes 47 and 48 can be maintained to a high degree of accuracy during manufacturing processes thereby insuring the perpendicularity of shafts 41 and 42 in the assembled component.

In further attempt at miniaturization it has been found advantageous to use reduction gearing between the input shaft and the ball 15, and to use an inverse ratio between diameters of the ball and the output rollers. Thus, in the preferred embodiment the speed ratio between gears 26 and 25 is 3:2 while between ball 15 and either of rollers 16 and 17 it is 2:3.

Returning now to FIG. 1, the shaft 10 is driven from the vehicle odometer at a speed of nominally one thousand revolutions per statute mile of travel of the vehicle. The speed changer 50 permits an adjustment of the actual odometer output to correspond to the nominal input to the resolver-integrator 11. The cage 12 is driven by the gyro compass 13 through gearing 14 to adjust the axis of rotation of the roller 24 (FIG. 3) to correspond to the course of the vehicle. Thus, as in the well-known manner of prior mechanical resolver-integrators of the ball type, the speed and heading values are integrated and composed into distance traveled north at shaft 41 and distance traveled east at shaft 42.

Shaft 41 is operatively connected to drive a generator 51, the output signal of which is thus proportional to the velocity in the north-south direction. This signal is used to provide the correction of the gyro compass 13 for the north steaming error in the manner described in U.S. Patent 2,677,194, for Gyroscopic Compass, for example.

Shafts 41 and 42 also drive the mechanical counters 52 and 53 respectively to insert into the counters the distances traveled north and east by the vehicle. The counters 52 and 53 are initially set by knobs 54 and 55 and the disconnecting clutches 56, 57 to the initial position of the vehicle so that the readings of the counters always indicate the coordinates of the present position of the vehicle, which may be position P of FIG. 2, for example. The clutches permit positioning of the counters without driving the shafts 41 and 42.

The distances traveled by the vehicles north and east are transmitted to the remote destination bearing and distance computer by any convenient means, either electrical or mechanical. FIG. 1 shows an electrical link where the step transmitters 58 and 59 are operatively connected to shafts 41 and 42 respectively and electrically connected to the respective step receivers 60 and 61. Receivers 60 and 61 are adapted to drive the counters 62 and 63 respectively through the clutch mechanisms 64 and 65 by means of gearing 66 and 67. The initial position of the craft is initially inserted in the counters 62 and 63 by means of knobs 68 and 69. Switches 70A and 71A, actuated when knobs 68 and 69 are operated, disengage the clutches 64 and 65 so that the adjustment of counters 62 and 63 can be done without adjusting the receiver motors 60 and 61. The distances traveled by the vehicle are set in the counters by the motors 60 and 61 so that the counters 62 and 63 continuously display the present position of the vehicle.

The north and east coordinates of the destination D (FIG. 2) of the vehicle are normally set in the counters 70 and 71 by the knobs 72 and 73 and are then locked in position, as by brakes 74 and 75, for example. A mechanical differential 76 is adapted to drive an output shaft 78 according to the difference in the displacements of the counter-driven shafts 62a and 70a so that the displacement of shaft 78 represents the distance to go in the north direction to reach the destination D.

Similarly, the output shaft 79 of the differential 77, connected to the shafts of counters 63 and 71, is displaced by an amount proportional in magnitude and sign to the distance to go in the east direction to reach the destination D.

The displacements of shafts 78 and 79 are transformed into proportional electrical signals in the potentiometers 80 and 81 respectively, or in any equivalent element for the same purpose. The outputs of potentiometers 80 and 81 energize the input windings 82 and 83 of an electromechanical resolver 84, which is shown in FIG. 1 as an induction-type resolver, but is not necessarily limited thereto.

The resolver 84 is adapted to compose the north and east components of the distance to go to destination into vectorial quantities of true bearing of the destination and the distance to the destination.

Thus, one output winding 85 is connected to a motor 86, through an amplifier 87, and the motor drives the winding 85 by means of the shaft 88 until the voltage energizing motor 86 is zero. Shaft 88 also drives one pointer 89 on a display dial 90 to indicate the bearing of the destination D.

The output of the other winding 91 of resolver 84 is proportional to the distance to go to destination. The output of winding 91 is matched against the output of a potentiometer 92 and the error signal is applied to a motor 93 through amplifier 94. Motor 93 drives shaft 95 and thereby adjusts potentiometer 92 until the error signal is zero so that the setting of the potentiometer 92 until the error signal is zero so that the setting of the potentiometer represents the distance to go to destination. This distance to go is displayed on the counter 96 which is also connected to the shaft 95.

The bearing display preferably also indicates the present heading of the vehicle by a second pointer 97. This pointer is positioned by compass 13 through the telemetering link including a synchro generator 98 operatively connected to the gyro compass 13 by gearing 14 and electrically connected to the synchro receiver 99 whose shaft 100 drives the pointer 97. The operator of the vehicle steers the vehicle in the direction which brings the pointer 97 closer to pointer 89, and when the pointers 97 and 89 are in register the vehicle track will lead directly to the destination. Usually, however, the terrain will permit only a reduction of the separation between the pointers 97 and 89 to a minimum.

We claim:

1. In a device of the character described, a pair of concentric inputs, a pair of perpendicularly disposed output rollers, a ball, and an idler roller urging said ball against said output rollers, the outer of said inputs having a transverse shaft adjacent its inner end, the inner of said inputs carrying a bevel gear adjacent its inner end, a bevel gear on said transverse shaft meshing with said bevel gear on said inner input, a roller on said transverse shaft, said roller being driven at a speed proportional to the speed of rotation of said inner input and the axis of rotation of said roller being controlled by the angular position of said outer input, said output rollers and idler roller being so positioned that their points of contact with said ball are all in the same equatorial plane of said ball and their planes of rotation are perpendicular to said equatorial plane, a second idler roller opposite said roller on said shaft, said second idler roller being mounted on a collar, gearing between said collar and said outer concentric input to keep said second idler roller and said roller on said transverse shaft in the same plane, and resilient means for urging said collar toward said ball.

2. In a device of the character described, a pair of concentric inputs, a pair of perpendicularly disposed output rollers, a ball, and an idler roller urging said ball against said output rollers, the outer of said inputs having a transverse shaft adjacent its inner end, the inner of said inputs carrying a bevel gear adjacent its inner end, a bevel gear on said transverse shaft meshing with said bevel gear on said inner input, a roller on said transverse shaft, said roller being driven at a speed proportional to the speed of rotation of said inner input and the axis of rotation of said roller being controlled by the angular position of said outer input, said output rollers and idler roller being so positioned that their points of contact with said ball are all in the same equatorial plane of said ball and their planes of rotation are perpendicular to said equatorial plane, a second idler roller opposite said roller on said shaft, said second idler roller being mounted on a collar, gearing between said collar and said outer concentric input to keep said second idler roller and said roller on said transverse shaft in the same plane, and resilient means for urging said collar toward said ball, said bevel gearing between said inner input and said transverse shaft being reduction gearing.

3. In a device of the character described, a pair of concentric inputs, a pair of perpendicularly disposed output rollers, a ball, and an idler roller urging said ball against said output rollers, the outer of said inputs having a transverse shaft adjacent its inner end, the inner of said inputs carrying a bevel gear adjacent its inner end, a bevel gear on said transverse shaft meshing with said bevel gear on said inner input, a roller on said transverse shaft, said roller being driven at a speed proportional to the speed of rotation of said inner input and the axis of rotation of said roller being controlled by the angular position of said outer input, said output rollers and idler roller being so positioned that their points of contact with said ball are all in the same equatorial plane of said ball and their planes of rotation are perpendicular to said equatorial plane, a second idler roller opposite said roller on said shaft, said second idler roller being mounted on a collar, gearing between said collar and said outer concentric input to keep said second idler roller and said roller on said transverse shaft in the same plane, and resilient means for urging said collar toward said ball, said bevel gearing between said inner input and said transverse shaft being reduction gearing, the ratio between said output roller and said ball being the same as between said input and said transverse shaft.

References Cited in the file of this patent

UNITED STATES PATENTS

| | | |
|---|---|---|
| 1,701,582 | Mengden | Feb. 12, 1929 |
| 2,412,468 | Newell | Dec. 10, 1946 |
| 2,477,527 | Pierce | July 26, 1949 |
| 2,586,421 | Evers | Feb. 19, 1952 |
| 2,858,980 | Bargmann | Nov. 4, 1958 |